United States Patent [19]
Rauscher et al.

[11] Patent Number: 6,022,505
[45] Date of Patent: Feb. 8, 2000

[54] PROCESS FOR MANUFACTURING CERAMIC METAL COMPOSITE BODIES, THE CERAMIC METAL COMPOSITE BODY AND ITS USE

[75] Inventors: Steffen Rauscher, Ulm; Michael Scheydecker, Nersingen; Karl Weisskopf, Leinfelden-Echterdingen; Tilmann Haug, Uhldingen-Muehlhof, all of Germany

[73] Assignee: Daimler-Benz Aktiengesellschaft, Stuttgart, Germany

[21] Appl. No.: 09/026,549

[22] Filed: Feb. 20, 1998

Related U.S. Application Data

[60] Provisional application No. 60/040,496, Feb. 20, 1997.

[30] Foreign Application Priority Data

Mar. 3, 1997 [DE] Germany .............................. 197 06 926

[51] Int. Cl.$^7$ ........................... C04B 35/02; C04B 35/46; C04B 35/60; C04B 35/76; C04B 35/80
[52] U.S. Cl. ........................ 264/643; 264/641; 264/654; 264/656; 264/681; 264/84
[58] Field of Search ................................. 264/641, 643, 264/654, 656, 681, 84

[56] References Cited

U.S. PATENT DOCUMENTS

| | | | |
|---|---|---|---|
| 5,487,420 | 1/1996 | Newkirk ..................................... | 164/97 |
| 5,520,880 | 5/1996 | Johnson et al. ........................... | 419/45 |
| 5,549,151 | 8/1996 | Yang ........................................ | 164/97 |
| 5,620,804 | 4/1997 | Kennedy et al. ......................... | 428/609 |
| 5,791,397 | 8/1998 | Suzuoki et al. ........................... | 164/97 |

FOREIGN PATENT DOCUMENTS

| | | |
|---|---|---|
| 0 116 809 A1 | 8/1984 | European Pat. Off. . |
| 0 253 497 A2 | 1/1988 | European Pat. Off. . |
| 0 790 223 A1 | 8/1997 | European Pat. Off. . |
| 196 05 858 A1 | 8/1997 | Germany . |
| 196 19 500 A1 | 11/1997 | Germany . |
| 197 50 599 A1 | 7/1998 | Germany . |
| WO 97/43228 | 11/1997 | WIPO . |
| WO 98/30725 | 7/1998 | WIPO . |

*Primary Examiner*—Daniel J. Jenkins
*Attorney, Agent, or Firm*—Evenson, McKeown, Edwards & Lenahan, PLLC

[57] ABSTRACT

A process for manufacturing a ceramic metal composite body in the case of which a dimensionally stable and porous sacrificial body is produced from ceramic initial products and is filled at a filling temperature with a softened metal, particularly under an increased pressure. The filled sacrificial body is heated to a reaction temperature and the metal to be filled in, BMe, is reacted with a metal of the ceramics, KMe, forming the ceramic metal composite body which has a ceramic phase having $KMe_mB_x$ and/or $KMe_nC_y$ and/or $KMe_oCN$ and $BMe_pO_3$ and has a metallic phase having an intermetallic compound which is formed of KMe and BMe, the filling temperature being lower than the reaction temperature and higher than or equal to the softening temperature of the metal.

24 Claims, 2 Drawing Sheets

PROCESS FOR MANUFACTURING CERAMIC METAL COMPOSITE BODIES, THE CERAMIC METAL COMPOSITE BODY AND ITS USE

BACKGROUND AND SUMMARY OF THE INVENTION

This application claims the priority of German Patent Document DE 197 06 926 and U.S. Provisional Application, Serial No. 60/040,496 which were filed on Feb. 20, 1997 and Mar. 3, 1997, respectively.

The invention relates to a process for manufacturing ceramic metal composite bodies, a ceramic metal composite body and its use.

Conventional brake disks are, as a rule, made of gray cast iron. A mature technology exists for this purpose which results in a low cost level in the series production. However, problems occur increasingly in modern vehicles because higher and higher masses must be braked while maximum speeds are raised. This circumstance results in the considerable rise of constructive expenditures for braking systems (for example, internal ventilation) because the heating of the brake disk above a critical temperature must be prevented. With the increase of size of brake systems, their mass will also increase; this has a negative effect on driving comfort.

Another currently used group of materials for brakes are MMCs (Metal Matrix Composites). As a rule, this is particle-reinforced aluminum; the reinforcing phase usually consists of ceramics, such as SiC or $Al_2O_3$. In the case of this class of materials, a lower density is in the foreground, whereby lower-weight components can be implemented. However, this material reaches its thermal limits at approximately 450° C. because, as a basic material, aluminum softens very rapidly and loses mechanical stability.

Carbon-fiber-reinforced carbons (C/C) have the lowest specific weight of all potential brake materials. These materials have successfully been used for a fairly long time in racing. Their disadvantage is mainly their high wear which would make them unprofitable for large series production. In addition, C/C's have lower thermal conductibility and heat capacity and so heat up less during braking.

If C/C materials are infiltrated with silicon, a ceramic SiC material is obtained which is reinforced with carbon fibers. This is an interesting brake material and has a low coefficient of friction but, like all fiber-reinforced materials, is very expensive.

Processes for manufacturing metal ceramics by means of the infiltration of porous ceramic bodies have been described in several patent documents.

U.S. Pat. No. 5,535,857 claims the manufacturing of a metal ceramic brake disk by way of infiltration of a porous SiC pre-body. For this ceramic body, SiC powder is pressed into the required shape and presintered so that open pore channels remain. The porous disk is then infiltrated by means of an aluminum alloy, whereby a metal-reinforced ceramic matrix is created. During the infiltration, the metal does not react with the matrix; the temperature stability of the material depends on the reinforcing matrix. In the case of an aluminum infiltration, this means that the application temperature of the material is 400° C.

U.S. Pat. No. 4,988,645 describes the infiltration of a ceramic pre-body with aluminum. In this case, the ceramic body is manufactured by way of an SHS, self-propagating high-temperature synthesis ignition of a reactive mixture in which the reaction maintains itself and, as reaction products, supplies the desired ceramic matrix.

In U.S. Pat No. 4,033,400, the infiltration of a porous ceramic body with a liquid metal is claimed, in which case the matrix consists of $Si_3N_4$ and the metal is composed of an Al-alloy. In this case also, it is important that no reaction is to take place between the matrix and the metal.

The firm Lanxide Technology also claims a number of materials which were produced by way of metal infiltration (for example, European Patent Documents EP-B-0 368 785 and EP-B-0 368 784). These patents essentially claim new process steps, as, for example, the targeted oxidation of the ceramic pre-body.

No reaction infiltration takes place in the above-mentioned patents. One exception is U.S. Pat. No. 4,585,618 in which a process is introduced in which infiltrated metal (aluminum) carries out a reaction with the matrix. It produces a reinforced $TiB_2/Al_2O_3$ ceramic material for electrolysis cells. A $TiO_2/B_2O_3Al$-mixture is infiltrated by means of aluminum. The infiltration time is 100 hours. The reaction product consists of $TiB_2/Al_2O_3/Al$, and $Al_3Ti$ is also found at the surface, which is not desirable.

From U.S. Pat. No. 5,215,011, a process is known for the manufacturing of a ceramic-metal composite body in the case of which a metal is charged by reaction infiltration into a sacrificial ceramic body. During the reaction infiltration, in a redox reaction, the metal to be filled in is oxidized to form a ceramic material during the filling and the material of the sacrificial body is simultaneously reduced. But when aluminum is used as the metal and titanium oxide ($TiO_2$) is used as the material of the sacrificial body, this reaction is so brisk that the ceramic structure of the sacrificial body is destroyed. Because of the destruction, the finished ceramic metal composite body will then have cracks and channels which are filled with pure metal. When such ceramic metal composite bodies are used in the case of rubbing and heating objects, like brake disks, this can melt metal and, among other things, lower the maximum load temperature. Furthermore, the overall costs for manufacturing are very high, particularly if very expensive titanium carbide (TiC) is used as the ceramic material of the sacrificial body.

It is an object of this invention to develop a process for manufacturing a ceramic metal composite body which ensures a higher quality of ceramic metal composite body and which has overall costs which are reasonable.

This object is achieved by manufacturing a dimensionally stable and porous body made of ceramic initial products with a metal, filling of the sacrificial body with softened metal and/or metallic alloy at a temperature which may be below the reaction temperature of the ceramic metal and the filling metal and heating the sacrificial body to a higher temperature. By the filling of the sacrificial body with a metal softened by heating, below a reaction temperature of the metal with the material of the sacrificial body, the ceramic matrix is maintained during the filling and also during the subsequent reaction between the charged metal and the material of the sacrificial body. Ideally, the filling of the pores of the sacrificial body takes place completely so that, in the case of a stoichiometric dimensioning of the concerned substances, the ceramic metal composite body is reacted completely and free of cracks and channels.

The characteristics of the material of a ceramic metal composite body according to the invention are good. For example, a ceramic metal composite body, which was produced with aluminum as the metal to be filled in (BMe) and Ti as the metal of the ceramic sacrificial body (KMe) according to the present invention, has a density of 3.4 $g/cm^3$, in which case this density is slightly higher than that of the MMCs but amounts to only 42% of the density of cast iron. Particularly in the preferred construction, in the case of the high-temperature-resistant compound in the form of the intermetallic compound TiAl, the field of application of the ceramic metal composite body reaches at least 800° C., which exceeds the values for gray cast iron.

The manufacturing of the sacrificial body mixing $TiO_2$ with a starting material results in another important advantage because very expensive TiC as the starting material for the sacrificial body is eliminated. In a large series production, the piece price could potentially be in the proximity of that of cast disks.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
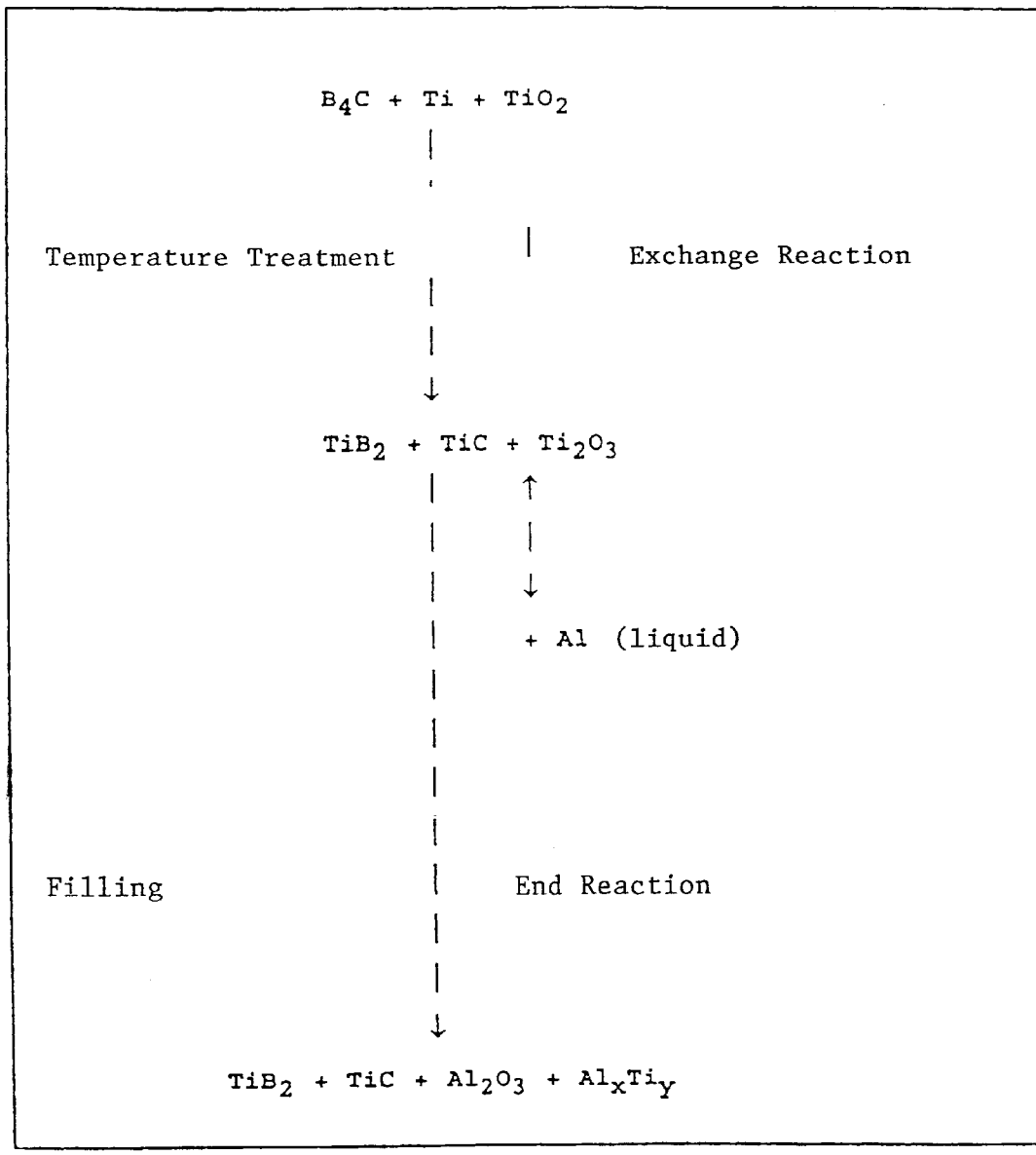
FIG. 1 is a schematic representation of an overall reaction according to the invention including an exchange reaction.

Reactive starting materials in powder form are coarsely mixed in a glass flask, the starting materials being in weighed stoichiometric ratios. Expediently, the mechanical mixture can also be prepared with an excess of carbon and/or oxygen. The excess of carbon results in a better reaction of the $TiO_2$, whereas an oxygen excess causes good oxidation of aluminum to $Al_2O_3$.

Subsequently, a binder (polypropylene carbonate) dissolved in acetone is added to the powder mixture. This slip is thoroughly mixed in a rotary evaporator and simultaneously dried. The dried material consists of large hard agglomerates which, in turn, must be crushed in a centrifugal mill.

In a round compression mold, the resulting mechanical mixture is pressed uniaxially to form a porous green body (mold diameter 60 mm, 100 mm, 330 mm).

After the pressing, the untempered green body having a ceramic matrix is subjected to an annealing operation at an exchange temperature for producing a ceramic and porous sacrificial body.

The annealing operation and the pressing can be exchanged with respect to one another; the annealing operation can be carried out first at the exchange temperature for the mechanical mixture and then the ceramic and porous sacrificial body can be pressed and optionally sintered from the tempered and annealed mechanical mixture.

Also fibers and/or a felt and/or a tissue—in the following summarized as fibers—can be added in a manner known per se to the mechanical mixture before the pressing to form the green body or the sacrificial body and can be mixed with the mechanical mixture. For example, short fibers are advantageous which have a length of less than 15 mm and more than 3 mm. Preferably, the fibers are produced of $Al_2O_3$ and SiC and/or metal, particularly steel, and/or minerals.

The exchange temperature is between 900° C. and 1,900° C., preferably in a range between 1,100° C. and 1,400° C., but always below a temperature which leads to an autocatalytic temperature, particularly to an explosion and with a temperature program which, in its ramps and holding times, fulfills the reaction mechanisms. A graphite-heated cold-wall reactor in a vacuum is normally used as the heater.

At a filling temperature, the thus obtained porous and ceramic sacrificial body are then filled with the metal and/or an alloy containing the metal in the same system. The filling temperature is within a temperature interval where the upper limit corresponds to a reaction temperature at which the metal to be filled in (BMe), particularly aluminum and/or magnesium, reacts with a metal (KMe) of the sacrificial body and whose lower limit is determined by the softening point or the softening temperature of the metal to be filled in (BMe). Particularly in the case of aluminum as the metal to be filled in (BMe), the filling temperature is below 1,000° C., particularly below 900° C.

Thus process steps for manufacturing the ceramic metal composite body are expediently:

The starting materials are preferably presented in powder form, particularly in a weighed manner;

fibers are optionally added to the starting materials;

in addition, a binder is added and mixed in a wet state;

then, drying takes place and subsequently the grinding into the mechanical mixture is carried out (for example, in a centrifugal mill);

the mechanical mixture is uniaxially pressed and is annealed before or after the pressing;

then the filling with metal takes place; and the heating;

which is followed by the finishing.

For manufacturing of the ceramic metal composite body, two reactions take place in separate process steps. The first step is a solid-solid reaction (exchange reaction) and the second step is a solid-liquid reaction (end reaction). Both reactions correspond to chemical redox reactions. A ceramic compound reacts with a metal, in which case a new ceramic compound is created and another metal becomes free.

In the following, the invention will be described by means of aluminum as the filling metal, in which case the invention can also be applied to other metal/ceramic types, which are found, for example, in U.S. Pat. No. 5,214,011, which is incorporated herein by reference.

The reaction between aluminum and titanium oxide is as follows:

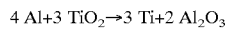

$$4\ Al + 3\ TiO_2 \rightarrow 3\ Ti + 2\ Al_2O_3$$

The special advantage of this example is the fact that a low-melting, low-price metal (aluminum) is reacted with a high-melting, expensive metal (Ti). A similar situation exists in the case of the occurring ceramic components. In this case, a low-value substance is also converted into a higher-value substance.

FIG. 1 shows a schematic representation of an overall reaction according to the invention, which may be carried out as described below.

a) Exchange Reaction

The first reaction step consists of the above-described annealing of the mechanical mixture or of the green body, in which case only the annealing of the green body is described here. The pressed ceramic green body, which consists of a stoichiometric mixture of $B_4C/3$ Ti and 2 $TiO_2$, is subjected to a temperature treatment during which the following reaction essentially takes place:

$$B_4C + 3\ Ti + 2\ TiO_2 \rightarrow 2\ TiB_2 + TiC + Ti_2O_3 + 0.5\ O_2$$

Thus, an exchange reaction takes place between $B_4$ and Ti which furnishes $TiB_2$ and TiC as the reaction products. Although the $TiO_2$ is reduced to a lower oxidation number, it does not influence the above-mentioned reaction which is why its behavior can be called quasi-inert.

The exchange reaction between $B_4C$ and Ti was selected because the reaction products $TiB_2$ and TiC promise good friction properties. Within the scope of the present invention, the reaction could be carried out in a controlled manner by means of a smooth temperature program.

In this process step, it is possible to manipulate the composition and the characteristics of the subsequent composite. A strongly negative volume change occurs during the exchange reaction. This means that the porosity which the pressed body has is considerably increased. After the annealing of the matrix, it is normally between 40% and 55%. In this case, it is extremely important to precisely adjust the porosity in this process stage, because, during the later filling of the sacrificial body, the porosity determines the Al (metal) quantity to be reacted and thus the final phase composition.

In order to adjust a specific porosity, on the one hand, the composition of the green body can be varied and, on the other hand, the reaction can be influenced by means of a suitable temperature program.

As an example, the variation of the composition of the green body is described in detail because it is possible, from the start, to completely or partially add to the green body the products of the exchange reaction $B_4C/Ti$, thus $TiB_2$ and (or) TiC. Stoichiometrically, the previously used formulas are as follows:

$0.5\ B_4C/1.5\ Ti/TiB_2/0.5\ TiC/2\ TiO_2$ $2\ TiB_2/TiC/2\ TiO_2$ $3\ TiC/0.7\ N/0.3\ 2\ TiO_2$

After the first reaction step, the ceramic sacrificial body has almost the same composition; only the porosity is changed. By means of this method, it is possible to precisely predetermine the functional ceramic components and therefore adjust specific material characteristics, such as the coefficient of friction.

b) End Reaction:

Before the end reaction is carried out, the porous and ceramic sacrificial body is filled with the aluminum. For the filling, a sacrificial body of a diameter of 100 mm and a thickness of 15 mm is placed in a diecasting mold and is infiltrated with Al whose temperature about its melting point amounted to particularly between 600 and 900° C. The infiltration time amounted to 40 ms at a pressure of 800 bar. Aluminum of a purity of 99.9% and/or an Al alloy, particularly Al/Si12, was used.

Subsequently, the filled sacrificial body is heated to a temperature of above 1,000° C. in a vacuum. The aluminum will melt, in which case Al and $Ti_2O_3$ react with one another above the reaction temperature. According to the composition, this reaction obeys approximately the following equation:

$4\ Al + Ti_2O_3 \rightarrow 2\ AlTi + Al_2O_3.$

During this reaction, the ceramic components $TiB_2$ and TiC, which in the finished material represent the functional groups, remain inert. The Al and the $Ti_2O_3$ react such that finally an at least largely dense molded body will be present.

Figure 2:
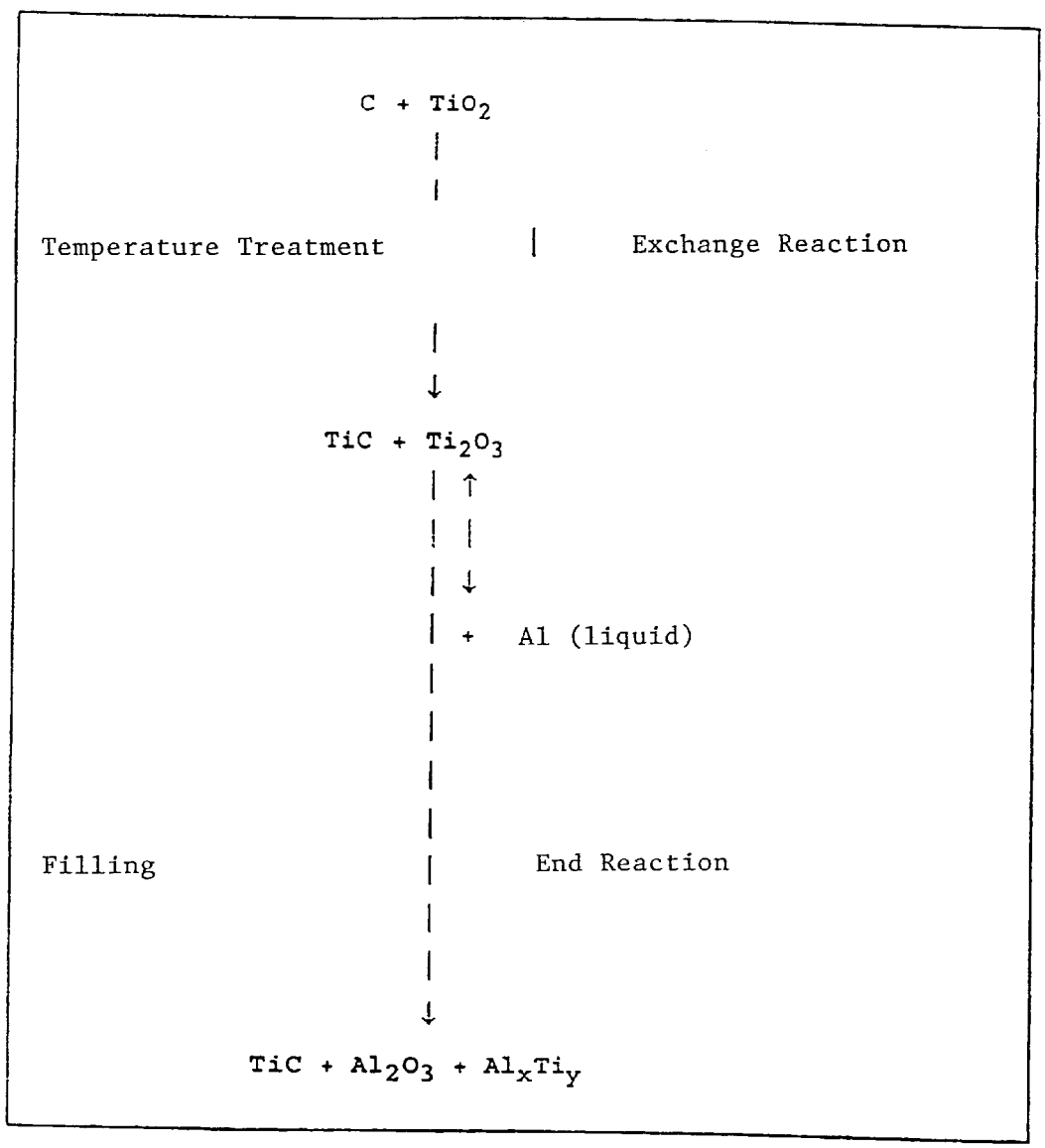
FIG. 2 is a schematic representation of an overall reaction according to the invention including an exchange reaction.

FIG. 2 shows a schematic representation of an overall reaction according to the invention, which may be carried out as described below.

Referring to FIG. 2, the reaction is described between aluminum and titanium oxide in the presence of elementary carbon, for example, in the form of powdered coal or graphite which, on the whole, is as follows:

$2\ C + 3\ TiO_2 + 5\ Al \rightarrow 2\ Al_2O_3 + 2\ TiC + TiAl$

Here also, aluminum is reacted with the Ti. A similar situation exists in the case of the occurring ceramic components. Here also, a lower-value substance is converted into a higher-value substance.

a) Exchange Reaction:

The first reaction step consists of the above-described annealing of the mechanical mixture or of the green body, in which case only the annealing of the mechanical mixture will be described in this example. The mechanical mixture, which consists of a stoichiometric mixture of C, Ti and $TiO_2$, is subjected to a temperature treatment in which essentially the following reaction takes place:

$C + 2\ Ti + 3\ TiO_2 \rightarrow TiC + 2\ Ti_2O_3$ $Ti_2O_3$ and TiC therefore exist as reaction products from which the sacrificial body is pressed. During the pressing, the sacrificial body is produced close to the final shape of the later ceramic metal composite body.

Also in this process step, it is possible to manipulate the composition and the characteristics of the later composite.

The end reaction will not be discussed because it takes place analogously to the previous example.

EXAMPLES

Example 1

A powder mixture with the stoichiometric composition $B_4C/3\ Ti/2\ TiO_2$ is mixed with a binder (polypropylene carbonate) and is uniaxially pressed to form a round disk. This disk is then annealed in a graphite-heated cold-wall reactor in a vacuum between 1,200° C. and 1,400° C. for 30 minutes. The resulting ceramic body has the stoichiometric composition $2\ TiB_2/TiC/Ti_2O_3$ and has a porosity of 55%. After the filling with Al by means of a diecasting operation, the filled sacrificial body is heated in the same furnace at 1,100° also in a vacuum for 1.5 hours. The resulting ceramic metal composite body consists of approximately 20% by volume $TiB_2$, 10% TiC, 15% $Al_2A_3$, 45% $Al_3Ti$ and 10% Al.

Example 2

A powder mixture with the stoichiometric composition of $2\ TiB_2/TiC/2\ TiO_2$ is processed and annealed under the same conditions as in Example 1. The ceramic sacrificial body also has the composition of Example 1 but has a porosity of 45%. After the reaction with the previously filled-in aluminum, the composition material has a metallic fraction of approximately 52% $Al_3Ti$ and 3% Al, the ceramic components remaining those of Example 1.

Example 3

A powder mixture of $TiO_2/C$ is annealed at 1,800° under a slight partial $N_2$ pressure (<1 mbar), resulting in a powder of the compound $TiC_xN_y$ (x, y according to partial $N_2$ pressure). The powder is mixed with $TiO_2$ at a ratio 3:2 and is processed as in Example 1. In the ceramic phase, the resulting material has only $TiC_xN_y$ and Al; the metallic phase is identical to that in Example 1.

The motivation for this invention was the development of a new brake material. The properties which this material has predestine it simultaneously for applications in all fields where high temperatures and a high wear occur. Such applications are particularly tribological systems and in this case preferably structure components in jet engines and engines, particularly slide bearings, cutting materials and particularly preferably brake disks.

In addition, an application is expedient as a composite material particularly for bullet-proof armoring.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A process for manufacturing a ceramic metal composite body, comprising:
   (a) making a dimensionally stable and porous sacrificial body made of ceramic initial products having a metal, denoted as KMe;
   (b) filling the sacrificial body with at least one of a softened metal and a metallic alloy, either denoted as BMe, at a predetermined filling temperature below the temperature at which KMe reacts with BMe; and
   (c) heating the sacrificial body to a temperature at which a reaction takes place between KMe and BMe,
   wherein a ceramic metal composite body is formed with a ceramic and a metallic phase;
   wherein the ceramic phase has at least one of $KMe_mB_x$, $KMe_nC_y$, $KMe_oCN$ and $BMe_pO_3$; and
   wherein the metallic phase contains an intermetallic compound made of KMe and BMe.

2. The process of claim 1, wherein step (c) is performed under an increased pressure.

3. The process according to claim 1, wherein pores of the ceramic sacrificial body are filled after the completed exchange reaction.

4. The process according to claim 3, wherein the pores are filled with at least one of aluminum and magnesium.

5. The process according to claim 1, wherein BMe is pressed into the sacrificial body by a diecasting process and the sacrificial body is then heated to temperatures above 1,000° C.

6. The process according to claim 1, wherein step (a) further comprises:
   mixing $TiO_2$ with at least one starting material containing at least one of boron and carbon to form a mechanical mixture, and heating the mechanical mixture to an exchange temperature between 900° C. and 1,900° C., the exchange temperature being below the temperature of an autocatalytic reaction, wherein the mechanical mixture is annealed forming the dimensionally stable and porous sacrificial body;
   wherein at the exchange temperature, an exchange reaction is carried out between the at least one starting material and the $TiO_2$ producing at least one of reaction products $TiB_x$ and $TiC_y$, wherein, $0 \leq x \leq 2$ and $0 \leq y \leq 1$.

7. The process according to claim 6, wherein the starting material contains at least one of boridic and carbidic ceramics.

8. The process according to claim 6, wherein the mechanical mixture is heated to an exchange temperature between 1,100° C. and 1,400° C.

9. The process according to claim 6, wherein the auto catalytic reaction is an explosion.

10. The process according to claim 6, wherein the dimensionally stable and porous sacrificial body is pressed from reaction products.

11. The process according to claim 6, wherein the reaction products are reacted with aluminum absorbed by a green body while forming the ceramic metal composite body with a ceramic phase having a composition of at least one of $TiB_x$, $TiC_y$ and TiCN and $Al_2O_3$ and a metallic phase having an intermetallic compound of Ti and Al.

12. The process according to claim 6, wherein a green body is pressed from the mechanical mixture and only the green body is heated to the exchange temperature and annealed.

13. The process according to claim 12, wherein the mechanical mixture is prepared stoichiometrically with at least one of an oxygen excess and a carbon excess.

14. The process according to claim 6, further comprising using a charged a binder which promotes a reaction between BMe and KMe.

15. The process according to claim 14, wherein the charged binder is dissolved in a solvent.

16. The process according to claim 15, wherein the solvent is an organic solvent.

17. The process according to claim 16, wherein the organic solvent is acetone.

18. The process according to claim 15, wherein the binder is at least one of polypropylene carbonate, sodium hydrogen silicate, ethyl silicate and polyvinyl alcohol.

19. The process according to claim 6, wherein at least one of $TiB_x$, $TiC_y$, and TiCN is added to the mechanical mixture.

20. The process according to claim 6, wherein fibers are added to and mixed with the mechanical mixture.

21. The process according to claim 20, wherein the fibers are short fibers having a length between 3 mm and 15 mm.

22. The process according to claim 20, wherein the fibers are felt or tissue.

23. The process according to claim 20, wherein the fibers are made of at least one of $Al_2O_3$, SiC, metal and minerals.

24. The process of claim 23, wherein the metal is steel.

* * * * *